United States Patent [19]
Inklaar

[11] 3,985,940
[45] Oct. 12, 1976

[54] METHOD TO IMPROVE ADHESIVE OF POLYOLEFIN SURFACES

[75] Inventor: Petrus Adam Inklaar, Diepenveen, Netherlands

[73] Assignee: Vasco Industries Corporation, Yonkers, N.Y.

[22] Filed: Nov. 28, 1973

[21] Appl. No.: 419,774

[30] Foreign Application Priority Data
Nov. 28, 1972 Netherlands.................. 7216086

[52] U.S. Cl................................. 526/22; 264/83; 264/241
[51] Int. Cl.² ........................................ C08F 8/08
[58] Field of Search.................. 156/283, 284, 334; 264/126, 82, 113, 241, 83; 526/22

[56] References Cited
UNITED STATES PATENTS

| | | | |
|---|---|---|---|
| 3,455,483 | 7/1969 | Inklaar............................. | 161/160 X |
| 3,474,159 | 10/1969 | Juveland et al................. | 156/334 X |
| 3,475,369 | 10/1969 | Blunt............................... | 156/334 X |
| 3,493,453 | 2/1970 | Ceresa et al.................... | 156/334 X |
| 3,674,593 | 7/1972 | Pearson et al.................. | 156/334 X |

*Primary Examiner*—Robert F. White
*Assistant Examiner*—James R. Hall
*Attorney, Agent, or Firm*—Albert C. Johnston

[57] ABSTRACT

A powder of a polyolefin, such as a normal polyethylene, having a melt index of between 2 and 20 is oxidized slightly and thereafter is sintered into a layer which will adhere strongly by thermal fusion to a polyolefin surface and also to a polar surface such as that of a layer or article composed of a polyamide, polyurethane or polyester resin. Large industrial articles such as containers and building construction elements can be produced with desired strength and surface properties by use of a sintered layer of that oxidized polyolefin powder to join to a polyolefin layer a layer of a polar resin or a different polyolefin layer. By being sintered in the presence of a blowing agent, the slightly oxidized powder forms a foamed bonding layer which will securely join together layers having different thermal expansion coefficients.

15 Claims, No Drawings

METHOD TO IMPROVE ADHESIVE OF POLYOLEFIN SURFACES

It is known to be difficult to obtain technically acceptable adhesion between a substrate and polyolefin surfaces such as of polyethylene, polypropylene and mixtures and copolymers thereof. This applies to low as well as high density types.

Yet there is frequently a need for obtaining a combination of the known and desirable properties of polyolefins, such as their stability under atmospheric conditions and especially their high resistance to a wide variety of chemical substances, with those possessed by other polymers such as polyamides, polyurethanes and, possibly glass fiber reinforced, polyesters.

It has been proposed to activate polyolefin surfaces by electric discharges, treatment with open flames or oxidizing agents. Such processes have been applied particularly in the manufacture of laminated films. In such way the surfaces of polyalkene and polyester films have been joined together by the action on the polyalkene film of open flames, corona discharges or of solutions or dispersions of oxidizing agents such as sodium perborate, chromic acid and persulphates. It is also known to activate the surface of polyethylene films by treatment with boron trifluoride, fuming sulphuric acid, sulphur dioxide or hot lye.

These processes, however, still have important disadvantages. Especially in the manufacture of articles of comparatively large size and comprising relatively thick, laminated plastic layers, such as is the case with constructional building elements but even more with large hollow objects, such as containers, tanks, piping and rigid, hollow packaging devices, it is extremely difficult to activate the entire surface to be laminated in such manner as will ensure a uniform and adequate adhesion to the surface of the next layer.

In such cases, especially when voluminous containers with a capacity of from 0.1 to 100 m$^3$ are concerned, disparaties are apt to occur and to prematurely cause local failures in the adherence between adjacent layers. Such failures are particularly frequent when solutions or dispersions of oxidizing agents are used which normally are very difficult to distribute evenly over a surface, and such methods almost always result in such surface not being activated everywhere to the same degree. Moreover, experience teaches that laminates obtained by bonding in such manner have inferior resistance to liquids, especially water and aqueous solutions, at elevated temperatures.

It is an object of the present invention to provide a method capable of producing large objects such as building elements and especially large hollow containers substantially consisting of thermoplastic material, in which objects surfaces of polyolefins are integrally and uniformly adhered to polar surfaces such as surfaces of polyamides, urethanes or polyester by means of a lightly oxidized easily melting intermediate layer or film of polyolefin.

It is a further object of the invention to provide a method of producing a continuous layer of oxidized polyolefin.

Still further the invention provides a method of combining polar thermoplastic surfaces with non-polar thermoplastic surfaces, especially surfaces of polyethylene, by a sintering process in which the relevant article is produced by indirect heating of the base thermoplastic material in a mold followed by covering the inner surface of the article so formed with a film of lightly oxidized polyolefin such as, especially, lightly oxidized polyethylene, and finally by a third layer of a sinterable thermoplastic, it being understood that the first and third layer can be of different polarity in the sense of polar combined with non-polar material.

The invention is based on the discovery that a uniformly oxidized polyolefin with a very low content of oxygen can be obtained by oxidizing the polyolefin in a powder form in a gaseous or liquid medium. Said oxidation may for example be carried out by the action of a molecular oxygen containing gas such as air or pure oxygen during a short period of one hour or less and at a moderate temperature preferably between room temperature and 100° C. One may also use a liquid oxidizing medium such as a solution of potassium bichromate. Particle size of the powder should be predominantly between one and one thousand micron and preferably between fifty and five hundred micron. The base material to be oxidized should be a polyolefin of moderate molecular weight having a melt index of about 1 to 30 and preferably 2 to 20. The lightly oxidized powder is spread on the thermoplastic surface to be adhered to another thermoplastic surface. Without the addition of any solvent and after spreading to an even layer heat is applied to form a continuous fluid layer on the thermoplastic surface. The free surface of said layer can be combined with another thermoplastic layer in said hot condition either directly or after cooling and reheating.

The lightly oxidized polyolefin layer adheres very well to a polyolefin surface and may serve also to bind the surface of a polyamid-, polyurethane- or polyester-layer or article to said polyolefin surface.

It has been proposed to prepare an oxidized polyethylene with improved adhesive properties but in the known case the base material consisted of a polyethylene which may be a powder, with a melt index of substantially zero this contradictory to the present invention where use is made of a normal polyethylene having a melt index of 1 to 30, which according to the known art was useless for the present purpose. An oxidation product of polyethylene of the known art with melt index 0.7 gave films which were at room temperature "weak and brittle" and could not be bent through 180° even once without shattering. The cause of this behavior is that the product with a melt index of substantially zero has an extremely high molecular weight and so it had to be rather strongly oxidized to obtain a workable end product. Such strong oxidation when applied to normal processable polyethylene leads to products with an extremely high melt index which are brittle and do not give an adhering film. They have lost their elastic properties completely. The determination of the melt index is described in ASTM specification ASTMD1238-52T.

The lightly oxidized polyethylene powder used according to the invention may be obtained by heating polyethylene powder in an inert atmosphere to a temperature of about 90° C and, while maintaining said temperature, conducting air through the powder during a period of from about 10 to about 40 minutes. It is also possible to conduct pure oxygen through the polyethylene powder, but in such case it is preferable to limit the temperature and time to respectively below about 50° C and less than about 15 minutes. After cooling, the powder is evenly distributed over the polyethylene surface and formed into a continuous layer of film uniformly covering said polyethylene surface by supplying heat.

Such heat may be supplied from any known source and by any known method. Such methods and sources may include conducting heat through a metal plate which has the polyethylene surface to be activated adjacent to it, by direct irradiation of the powder, by feeding the polyethylene film or polyethylene sheet covered with the slightly oxidized powder through heated rollers or drums, by induction heating, capacitative electric heating, or by means of a hot gas stream or in an oven.

It is also possible to suspend the polyethylene powder in an oxidizing liquid, such as nitric acid or acid sodium bichromate, and, if necessary, to heat such dispersion to evenly oxidize the powder.

In all cases, the degree of oxidation should be limited since otherwise the powder will not by melting form into a coherent layer or film.

Constructional building elements may be produced by known means comprising rollers or endless conveyor belts which may constitute an integral part of the heating system in which the lightly oxidized polyethylene powder on an underlying polyethylene surface is fed through heated rollers or drums.

To the layer formed from the molten, slightly oxidized powder and either after partial or complete cooling thereof or not, a film or a sheet of a polar material may be bonded or, alternatively, a layer or film of the same polyolefin or a polyolefin of different color and/or having a higher melting point.

By adding a blowing agent to the slightly oxidized polyolefin powder, such powder may be formed into a foamed layer which has special usefulness in serving, according to the invention, as the bonding vehicle between two layers having different thermal expansion coefficients. In this way, a laminate of materials having such different thermal expansion coefficients may be produced showing substantially reduced deformation when subjected to elevated or low to very low temperatures.

The next layer may also be applied by spraying or melting-on methods or the like. For example, by such methods a layer of polyurethane or a glass fiber or otherwise reinforced polyester layer may be applied.

The bonding layer formed from the slightly oxidized polyolefin powder should preferably have a thickness of at least 0.5 mm. The upper limit is more difficult to specify, but for most applications lies around 10 mm. For even larger thicknesses, it would be recommendable to add a cross-linking agent; for example a peroxide.

The slightly oxidized layer as such may be used to improve the printability of polyethylene surfaces.

In case of hollow objects, the sinter molding process for thermoplastic materials — said process being known as such as illustrated by e.g. U.S. Pat. No. 3,455,483 — is especially suitable for forming the thermoplastic articles having the polyalkene surface that is to be activated, as well as the activating layer or film.

According to said process, the activating layer or film may be formed either prior to or after the molding of the polyalkene body.

It is also possible by means of such sintering in a mold or on a flat metal surface, to form larger sized elements and to join such elements at a later stage or on the spot into objects of even extremely large volume. In this manner, storage tanks having a capacity of 1,000 m$^3$ or more may be manufactured by joining such elements according to known methods, including welding.

The degree of oxidation of the polyethylene powder is determined, on the one hand, by its melt index which should preferably be in the range between about 2 and about 20 and, on the other hand, by the requirement that the oxidized polyethylene powder has to be applied by melting with formation of a film when heating it.

It has been found that a too strong oxidation of the polyethylene powder will not result in an end product that can be sintered into a coherent layer or film.

The suitable degree of oxidation of the polyethylene powder may be easily determined by spreading the powder evenly to a thickness of about 1 mm over a flat and smooth surface, preferably of polished aluminum. When heat is then applied, the powder should melt into a coherent layer at a temperature below about 150° C. The particle size of the polyalkene to be oxidized should preferably be between 0.25 and 0.40 mm. The polyalkene powder may also be dispersed in an oxidizing medium, such as a bichromate solution, concentrated sulphuric acid or a persulphate solution, in which it is heated until the desired degree of oxidation has been attained. The powder is then separated from the dispersion by filtering or may be washed out - with water and/or a volatile organic solvent, such as acetone, methylethylketone or alcohol - and subsequently dried.

The following examples are illustrative only and should not be construed as imposing limitations on the invention other than as set forth in the appended claims.

EXAMPLE I

Polyethylene powder (Stamylan 1300, trade mark of DSM, Netherlands) with a density of 0.918 and a melt index of 7 was oxidized by the method of spreading it out flatly over a porous surface, heating the powder while conducting nitrogen gas through it to a temperature of 90° C and, while maintaining said temperature, agitating the powder and slowly conducting air through it for 15 minutes. The powder was then allowed to cool in an inert atmosphere.

A rectangular container (dimensions 25 × 25 × 30 cm) molded from Stamylan 1300 and having a wall thickness of 4 mm was taken and a self-hardening polyurethane composition sprayed on to the inside of the container to a layer thickness of 0.1 mm. No adherence whatever resulted between the polyethylene and the polyurethane. Identical containers were made with, on the inside, an additional thin layer sintered from chlorinated polyethylene powder. In the case of three of such containers - the polyethylene powder used to form therein inner, thin chlorinated layers containing respectively 1.4, 2.7 and 3.2% of chlorine - again no adherence resulted with the polyurethane composition sprayed on to the insides of those containers as in the first case.

A strong adherence did result only by spraying of the polyurethane composition in the manner hereinbefore indicated when the containers were provided by sintering with an inside thin layer of lightly oxidized polyethylene powder according to the invention. When such containers were provided, according to the invention, with a thin layer of slightly oxidized polyethylene powder on the outside and the self-hardening polyurethane composition was sprayed on to the outside, during the first trials no adherence resulted. It was, however, discovered that this failure was caused by the release agent used for treating the inside surface of the mold. It was found that even a very small amount of that release agent (a silicone) interfered with the adherence of the polyurethane. However, once the outer thin layer sintered from slightly oxidized polyethylene powder was lightly scoured with sand paper after removal of the container from the mold, an excellent adherence was obtained with the polyurethane composition sprayed on subsequently.

EXAMPLE II

For use as an oxidizing agent, a mixture was made consisting of:

215 cm³ of concentrated sulphuric acid;
35 g of potassium bichromate; and
250 cm³ of water.

In this mixture 100 g of polyethylene powder (Stamylan 1300, density 0.918, melt index 7) was dispersed. At a temperature of 40° C the dispersion was intensively stirred during 5 minutes. Then the polyethylene powder was separated from the dispersion by careful and repeated washing. After washing, the powder was dried in an oven during 48 hours at a temperature of 60° C. The dried powder was then sintered at 170° C into a sheet (20 × 20 cm). After cooling and removal from the mold, a moisture curing polyurethane resin was applied to the sheet. After the polyurethane resin had hardened out, it could not even be worked loose from the polyethylene sheet by bending the sheet to the extent of the ends thereof joining each other.

Polypropylene applied (instead of the polyurethane resin) to such sheet sintered from lightly oxidized polyethylene powder gave such a strong bond that it was impossible to separate the layers along their bounding surfaces by means of mechanical forces.

With special precautions polypropylene powder can be used instead of polyethylene. In such case the oxidation period has to be one tenth to one hundredth of the oxidation time with polyethylene. The polypropylene powder should preferably be taken from the production unit before any additive has been added.

I claim:

1. A method of producing a thermoplastic article comprising a bonding layer for adhering by fusion with a polar or a non-polar thermoplastic surface, which method comprises
    1. contacting and heating with one another slightly oxidized polyethylene or polypropylene particles, on a surface having the configuration to be given said layer and at a temperature sufficient to melt said particles, and
    2. continuing such contacting and heating until such slightly oxidized particles have fused together into a coherent layer over said surface, to constitute said binding layer said particles having been prepared by
        a. heating at an elevated temperature not exceeding 100° C. and in contact with a fluid oxidizing medium non-oxidized polyethylene or polypropylene particles having a melt index between 2 and 20 and a particle size predominantly between .001 and 1 mm., and
        b. discontinuing said heating at a stage thereof in which said particles are slightly oxidized to an extent rendering said particles adherable by fusion to polar thermoplastic surfaces yet keeping said particles with a melt index between about 2 and about 20 and still fusible together into a coherent layer at a temperature below 150° C.

2. A method according to claim 1, said slightly oxidized particles having been prepared in steps (a) and (b) by contacting polyethylene particles having a particle size predominantly between 0.05 and 0.5 mm. at a temperature of the order of about 90° C. with air for no longer than about one hour.

3. A method according to claim 1, said slightly oxidized particles having been prepared in steps (a) and (b) by contacting polyethylene particles having a particle size predominantly between 0.05 and 0.5 mm. at an elevated temperature not exceeding about 50° C. with substantially pure oxygen for not longer than about 15 minutes.

4. A method according to claim 1, said slightly oxidized particles having been prepared in steps (a) and (b) by contacting polyethylene particles having a particle size predominantly between 0.05 and 0.5 mm. in a heated aqueous liquid medium with an oxidizing agent selected from the group consisting of nitric acid, concentrated sulfuric acid, bichromates and persulfates and mixtures thereof, and thereafter separating, washing and drying the particles.

5. A method according to claim 1, and forming upon and in union with a side of said coherent layer a distinct layer of a polar thermoplastic resin selected from the group consisting of polyamides, polyurethane and polyesters.

6. A method according to claim 1, said contacting and heating of slightly oxidized particles in steps (1) and (2) being effected on a surface of a preformed layer of polyethylene or polypropylene, said coherent layer thus being formed in union with one side of said preformed layer.

7. A method according to claim 1, said contacting and heating of slightly oxidized particles in steps (1) and (2) being effected on a surface of a preformed layer of a polar thermoplastic resin selected from the group consisting of thermoplastic polyamide, polyurethane and polyester resins, said coherent layer thus being formed in union with one side of said polar resin layer.

8. A method according to claim 1, said contacting and heating of slightly oxidized particles in steps (1) and (2) being effected on a surface of a preformed thermoplastic resin layer, said coherent layer thus being formed in union at one side thereof with said preformed layer surface, (3) and forming upon and in union with the other side of said coherent layer a third layer of thermoplastic resin, one of said preformed and third layers being a layer of polyethylene or polypropylene and the other of them being a layer of a polar thermoplastic.

9. A method of producing a thermoplastic article, which comprises
    1. contacting and heating with one another slightly oxidized polyethylene particles at a temperature sufficient to melt said particles and on a surface of a thermoplastic layer preformed by fusing together non-oxidized polyethylene particles,
    2. continuing such contacting and heating until such slightly oxidized particles have fused together into a coherent layer over and having a side thereof in union with said preformed layer surface, and 3. forming upon and in union with the other side of said coherent layer a distinct layer of a polar thermoplastic resin selected from the group consisting of thermoplastic polyamide, polyurethane and polyester resins, said slightly oxidized particles having been prepared by
   a. heating particles of a non-oxidized polyethylene powder having a melt index between 2 and 20 and a particle size predominently between 0.05 and 0.5 mm. in contact with oxygen containing gas at an elevated temperature not exceeding 100° C., and
   b. discontinuing said heating at a stage thereof in which said particles are slightly oxidized to an extent rendering said particles adherable by fusion to polar thermoplastic surfaces yet keeping said particles with a melt index between about 2 and about 20 and still fusible together into a coherent layer at a temperature below 150° C.

10. A method according to claim 9, said polar resin layer being a layer of polyurethane.

11. A thermoplastic article produced by the method of claim 1.

12. A thermoplastic article produced by the method of claim 5.

13. A thermoplastic article produced by the method of claim 6.

14. A thermoplastic article produced by the method of claim 8.

15. A thermoplastic article produced by the method of claim 9.

* * * * *

UNITED STATES PATENT OFFICE
CERTIFICATE OF CORRECTION

Patent No. 3,985,940                      Dated October 12, 1976

Inventor(s) Petrus Adam Inklaar

It is certified that error appears in the above-identified patent and that said Letters Patent are hereby corrected as shown below:

Column 5, line 58, "binding" should read --- bonding ---.
Column 5, line 58, insert a comma after "layer".

Signed and Sealed this

Fourth Day of January 1977

[SEAL]

Attest:

RUTH C. MASON
*Attesting Officer*

C. MARSHALL DANN
*Commissioner of Patents and Trademarks*